Dec. 9, 1924.

H. P. KRAFT 1,519,096

COUPLING FOR AIR CHUCKS

Filed June 28, 1921

Inventor
Henry Phillip Kraft,
By   Attorney
Fraser Lurk & Myers

Patented Dec. 9, 1924.

1,519,096

UNITED STATES PATENT OFFICE.

HENRY PHILLIP KRAFT, OF RIDGEWOOD, NEW JERSEY; EDGAR J. PHILLIPS AND EARL A. DARR EXECUTORS OF HENRY P. KRAFT, DECEASED.

COUPLING FOR AIR CHUCKS.

Application filed June 28, 1921. Serial No. 480,994.

*To all whom it may concern:*

Be it known that I, HENRY PHILLIP KRAFT, a citizen of the United States of America, residing in Ridgewood, in the county of Bergen and State of New Jersey, have invented certain new and useful Improvements in Couplings for Air Chucks, of which the following is a specification.

The present invention relates to couplings for air chucks and aims to provide certain improvements therein.

In certain types of air chuck couplings the air chuck member proper is coupled to the flexible carrying hose by a union, two elements of said union being connected with the chuck member. One of said two elements is usually provided with a tapered hollow shank adapted to seat within the mouth of the flexible hose to form a leak-tight joint therewith when the other elements are screwed together. In this type of coupling, the element provided with the tapered shank is usually directly carried by the chuck member while the second element is mounted to freely move thereon, and during the coupling operation, in order to prevent the turning of this tapered shank, it must be held by a wrench or other suitable tool. The provision of a wrench engaging portion on this member necessitates making the shank element longer, which means the use of additional material in its manufacture.

According to the present invention, I provide a coupling of this general type wherein less material is used and the necessity of holding the shank member with a wrench is obviated. By the present invention I provide a coupling comprising a male element adapted to be carried by the hose, and a female element loosely mounted on a tapered hollow shank which is adapted to be directly connected to the chuck. The male element is preferably provided on its interior with longitudinally extending grooves into which lateral lugs on the shank are adapted to move. This groove and lug arrangement restrains the shank from turning relatively to the male element when the male and female elements are threaded together. The invention also includes various other features of improvement which will be hereinafter more fully described.

Referring to the drawings, which illustrate one embodiment of the invention:—

Figure 1:
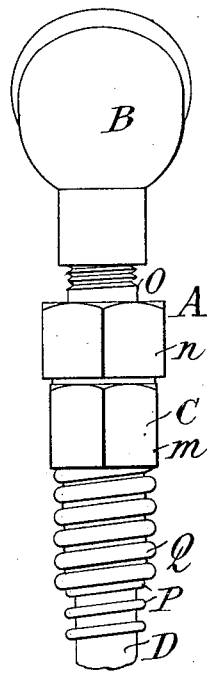
Figure 1 is a top plan view of the air chuck coupling.
Figure 2:
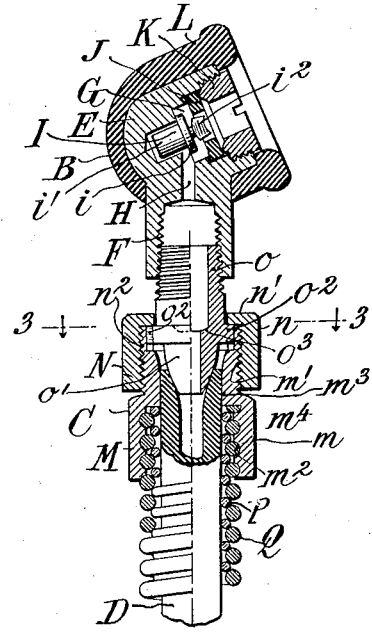
Fig. 2 is a longitudinal section thereof.
Figure 4:
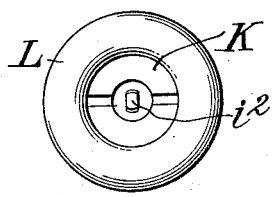
Fig. 4 is a bottom plan view of the air chuck.
Figure 3:
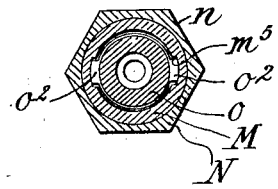
Fig. 3 is a transverse section taken on the line 3—3 of Fig. 2.

Referring to the drawings, let A indicate the air chuck coupling as a whole, which comprises the chuck member B to which is connected the union C, one element of said union being securely fastened to a hose D in any suitable manner.

The chuck member B, which may be of any preferred construction, is herein disclosed as consisting of a head E, an internally threaded neck F, and a valve chamber G, communicating with the neck F through a passage H. Within the valve chamber G is located a valve I, adapted to normally seat against a rubber packing J when subjected to air pressure from a suitable source, the packing J being held in place within the head by a threaded hollow screw plug K. The valve I preferably consists of a member provided with a disk-like head $i$ of smaller diameter than the chamber G, a shank $i'$ movable in a suitable guide recess formed in the chamber, and a tire valve depressing pin $i^2$ which projects through an opening in the valve seat and is adapted to raise the valve I off its seat and hold it open by engaging the tire valve pin when the chuck is applied over a tin valve. The head E of the chuck is herein shown as enclosed within a rubber jacket L which prevents said head from being damaged by rough usage.

The union C which provides the coupling connection between the chuck member and the flexible hose constitutes an important feature of the present invention. According to the preferred embodiment of said union, as it is herein disclosed, it consists of three distinct elements M, N and O. Of these elements, the member M may be termed the male element, the member N the female element and the member O the shank. The member M preferably comprises an exterior polygonal wrench engaging portion $m$ and an exterior screw-threaded nipple portion $m'$. Internally, said member M is provided with a screw-thread $m^2$ of large pitch opposite the wrench engaging surface $m$ and with a substantially smooth bore $m^3$ opposite the screw-threaded portion $m'$. The bore $m^3$ is preferably of smaller diameter than the thread $m^2$, thereby forming at their juncture a shoulder $m^4$, the function of which will hereinafter become apparent from the disclosure. The interior of the bore $m^3$ adjacent its top is provided with one or more longitudinal grooves $m^5$, two being herein disclosed, adapted to receive a corresponding number of lateral lugs formed on the shank O for the purpose of preventing relative rotation between said members during the coupling operation. The member N, which is adapted to fit loosely over the shank member O, comprises a sleeve member having an exterior polygonal wrench engaging surface $n$, an inturned annular flange $n'$ at one end thereof, and an internal screw-thread $n^2$ adapted to engage over the external thread on the member M. The shank member O, as herein disclosed, is formed at one end with an externally screw-threaded portion $o$ adapted to screw into the neck of the chuck, and at its opposite end with a conical portion $o'$ adapted to enter the flexible hose to form a leak-tight joint therewith. The intermediate portion of the shank is substantially cylindrical and is provided with lateral lugs $o^2$ adapted to enter the grooves $m^5$ in the member M. The shank has a bore extending therethrough whereby to permit the free passage of fluid from the hose to the chuck.

In order to reinforce the flexible hose D and at the same time provide a suitable connection between the hose and the union, I enclose a portion of said hose adjacent one end within a pair of tightly coiled helical springs P and Q. These springs, which are preferably formed of different gauge wire, are so wound that the convolutions of the smaller spring serve to support and interspace the convolutions of the larger spring. The convolutions of the larger spring Q serve as screw-threads in attaching the hose to the union by engaging the interior threads $m^2$ formed therein. The shoulder $m^4$ on the member M serves to limit the inward movement of the spring Q, but permits the entrance of the free end of the hose into the bore $m^3$ wherein it is securely held by the springs.

In assembling the air chuck coupling hereinbefore described, the union element N is first slipped over the threaded end of shank O and said threaded end is then tightly screwed into the neck of the chuck. The flexible hose D with its encircling spring is then secured to the member M through the medium of screw-threads $m^2$. In this operation it is preferable to leave the entering end of the hose free of the encircling spring whereby said free portion may enter the bore $m^3$ for a substantial distance. The hose end carrying the member M is then grasped in one hand while the chuck carrying the shank and movable sleeve N is grasped in the other hand. The two are then placed end to end and the sleeve N threaded over the nipple $m'$ by turning it with the fingers. During this coupling operation the lugs $o^2$ which are moved forward enter the grooves $m^5$ and prevent rotation of the shank member. As the shank member moves forward the conical head $o'$ enters the open end of the hose, forcing the outer wall thereof against the wall of bore $m^3$, forming a leak-tight seal therewith. As thus connected the device is ready for use. If, for any reason it is desired to uncouple the parts the coupling operation aforementioned is reversed. It will thus be seen that I have provided an improved practical coupling device wherein the use of a wrench or other equivalent means for holding the coupling members against rotation during the assembling and disassembling operations is obviated. It will also be appreciated that the device herein disclosed permits of the more facile assembly of devices of this class.

While I have shown and described but a single embodiment of my invention, it will be understood that I do not wish to be limited thereto, as various changes may be resorted to without departing from the spirit of the invention.

What I claim is:—

A coupling for air chucks or the like comprising a hollow element adapted to carry a flexible hose, a shank member adapted to enter said element, a coupling sleeve loosely carried by the shank member and having a part adapted to engage the hollow element to force the shank member into leak-tight engagement therewith through the medium of the flexible hose, and cooperating means on the hollow element and shank member for preventing relative rotation between said parts during the coupling or uncoupling operation, said means being located beyond the engaging areas on the shank member and flexible hose.

In witness whereof, I have hereunto signed my name.

HENRY PHILLIP KRAFT.